July 9, 1957 — L. H. FLORA — 2,798,277
SEPARABLE FASTENER
Filed June 8, 1953

INVENTOR
LAURENCE H. FLORA

BY
H. G. Lombard
ATTORNEY

United States Patent Office 2,798,277
Patented July 9, 1957

2,798,277

SEPARABLE FASTENER

Laurence H. Flora, Cleveland, Ohio, assignor to Tinnerman Products, Inc., Cleveland, Ohio, a corporation of Ohio Application June 8, 1953, Serial No. 360,117

4 Claims. (Cl. 24—221)

This invention relates to improvements in separable fasteners which are adapted to be easily and quickly actuated to secure or release the parts of an assembly wherein speed in fastening or unfastening of the assembly is necessary or desirable.

The invention has particular application and use in the provision of separable assemblies wherein a panel or plate-like part is releasably secured over a supporting part, as, for example, in the manner of a cover for a junction box or other container, or as a similar cover or closure for a panel opening or access opening, or the like.

Separable fasteners of this character are commonly known as rotary fasteners and comprise a rotary stud equipped with lateral lugs and adapted by a quarter turn to be engaged with or disengaged from a cooperating socket member. The socket member of such a fastener is usally attached by separate bolts, screws, rivets, or other auxiliary attaching means requiring special assembling operations for applying the same. In the rotary fastener of the present invention, the socket member is provided with attaching means comprising an integral clasping portion, or the like, whereby the socket member is adapted to be easily and quickly attached in self-sustained fastening position on a supporting part, thereby providing for considerable savings in the cost of such auxiliary attaching means and in the time and labor required for the special operations for applying the same.

Heretofore, such self-attached socket members have been adapted for attachment to a supporting part of a specific thickness only, and accordingly, the use thereof has been more or less limited due to the fact that the socket members would not seat properly on parts of other thicknesses nor clasp the same with the necessary degree of clamping pressure required for proper function of the socket member with its cooperating rotary stud.

A primary object of the invention, therefore, is to provide a rotary fastener including a self-attached socket member of the kind described which is adapted for operative attachment to any of several different supporting parts in a predetermined range of thicknesses, and which is otherwise adapted to seat properly on any such supporting part in the most effective manner for its intended fastening purpose with a cooperating rotary stud member.

A further object of the invention is to provide a rotary fastener including a self-attached socket member of this character which is adapted to be attached to apertured supporting parts of considerably different thicknesses, with said socket member comprising a simplified sheet metal device defining a pair of spaced body portions for embracing any such supporting part together with a resilient spring arm provided on one of said body portions and cooperating with the other body portion in a manner to adapt the socket member to the thickness of said supporting part in order to seat said socket member thereon in its most effective and proper fastening position.

Another object of the invention is to provide such a self-attached socket member which includes a locking detent serving as an indexing or positioning means that is easily and quickly applied to the aperture in said supporting part through the medium of a sight opening adjacent said detent for guiding the socket member to attached fastening position.

A further object is to provide a self-attached socket member of this kind having such indexing means which are designed to center the socket member in attached position over a stud receiving opening in a part and otherwise automatically lock the socket member in such attached fastening position.

Further objects and advantages, and other new and useful features in the construction, arrangement and general combination of elements of the improved socket member of the invention will be apparent as the following description proceeds with reference to the accompanying drawings, for purposes of illustration but not of limitation, in which like reference characters designate like parts throughout, and in which.

Figure 1:
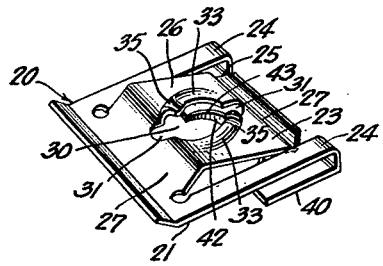
Fig. 1 is a perspective view of the improved self-attached socket member of a rotary fastener which is constructed for operative attachment to supporting parts of different thicknesses in accordance with the invention.
Figure 7:
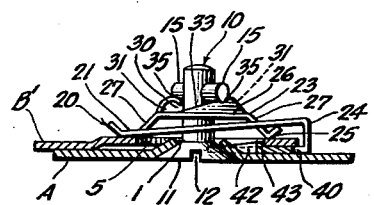

Referring now, more particularly, to the drawings, there is illustrated in Fig. 7 the secured portions of a pair of superposed plate or panel like parts A, B', substantially in the manner in which such parts would be arranged to provide the part A as a cover or closure for an area defined by the marginal edge of an access opening, for example, in a casing or other fixed or supporting part B'. The parts A, B', may be of any metal, wood, plastic or other suitable material and provided in any desired shape or design, and in the present example, said parts A, B', are shown provided in the manner of sheet metal stampings, or the like. The removable panel or cover plate A is provided at spaced points around its periphery with as many rotary studs 10 as may be necessary for securing said cover plate A in operative position on the fixed or supporting part B'. The rotary studs 10 are of a standard design having an enlarged head 11 at one end provided with a tool receiving slot 12 and a cross-pin adjacent the other end thereof defining laterally projecting ears or lugs 15. Preferably the rotary stud 10 is attached to said part A with its head 12 in flush relation to the outer exposed surface thereof and, to this end, said part A is provided with a countersunk aperture 1 in which the countersink corresponds substantially to the formation of said head 12. The rotary stud 10 is secured in said countersunk aperture 1 in an arrangement in which said stud 10 is passed through said aperture 1 and the cross-pin providing the lateral lugs or ears 15 when connected thereto in a manner whereby said lugs 15 overlap the edge of said aperture 1 and thereby retain said rotary stud 10 against removal from attached relation on said part A.

Figure 2:
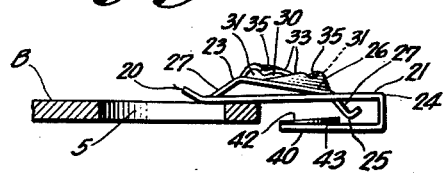
Fig. 2 shows the socket member of Fig. 1 in side or edge elevation as applied to an apertured supporting part of relatively thick dimension, represented in section.
Figure 6:
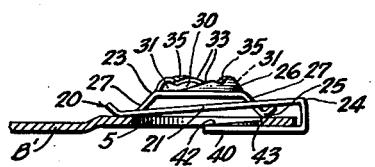
Fig. 6 is a sectional view showing the socket member of Figs. 1 to 5, inclusive, as applied to fastening position on a different supporting part of relatively thin dimension to seat thereon with equal effectiveness; and, Fig. 7 is a similar sectional view showing a cooperating rotary stud in fastened engagement with the attached socket member to secure a cooperating part to the supporting part.
Figure 3:
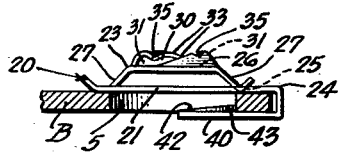
Fig. 3 is a view similar to Fig. 2 showing the socket member in fully attached fastening position on such supporting part.

The fixed or supporting part may be of any thickness between a relatively thick panel B, as shown in Figs. 2 and 3, and a relatively thin panel B', as seen in Figs. 6 and 7, and in any case is provided with a suitable stud receiving opening 5 which may be of any suitable outline, but preferably is provided as an enlarged circular hole 5 adapted to align with the rotary stud 10 attached to the removable panel or cover plate A. The predetermined combined thickness of the superposed parts A, B, indicates the length of the stud 10 which is necessary to provide the lateral lugs with the required spacing from the head 11 of the stud 10 for any particular assembly.

Figure 4:
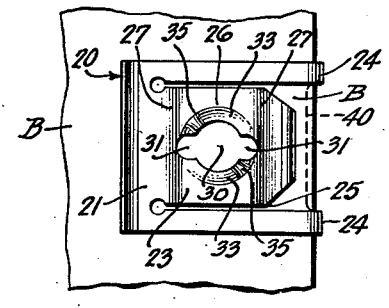
Fig. 4 is a top plan view of Fig. 3 showing the stud engaging means of the socket member.

The socket member 20 is a simple, inexpensive, one-piece sheet metal device which is adapted to clasp the marginal edge of the supporting part B or B' over the opening 5 in self-attached fastening position thereon. In this regard, the self-attached socket member 20 comprises a floating, resilient spring arm 23, serving as a yieldable take-up means which adapts said socket member for attachment to supporting plates or panels of different thicknesses, together with attaching means including a locking detent serving as an indexing or positioning means and an adjacent sight opening which facilitates application of said socket member to attached fastening position on the apertured supporting part B, Figs. 2–4, inclusive, or B', Figs. 6 and 7.

Said socket member 20 is best provided from a suitable blank of spring metal or cold rolled metal having spring-like characteristics, and which is readily obtained from standard sheet metal strip stock with little loss or waste of material. A suitable section of sheet metal strip material is provided with a generally U-shaped bend defining a body portion 21 and a shorter return bent body portion 40. These body portions 21, 40, are spaced apart a distance corresponding to the range of thicknesses of the parts to which the socket member 20 is intended to be attached. The body portion 21 is provided with a pair of spaced longitudinal slits providing a spring arm 23 between side portions 24 which define the generally U-shaped formation of the socket member and connect the body portions 21, 40, in predetermined spaced relation. The spring arm 23 extends free toward the bight between the body portions 21, 40, and terminates in an outwardly bent end defining a rounded bearing portion 25 adapted for ready sliding contact with the adjacent surface of the part B or B' to which the socket member 20 is attached. The spring arm 23 otherwise is bent to provide an upwardly offset base 26 between downwardly extending flanges 27, or the like, adapted to support said base 26 in resilient spaced relation to the part B or B' to which the socket member 20 is attached.

The said base 26 of the spring arm 23 is provided with a central stud passage 30 having lateral slots 31, Fig. 3, for passing the lateral lugs 15 on said rotary stud 10. The portions adjoining said stud passage 30 are bent outwardly in the manner of oppositely extending spiral-like cam surfaces 33 each rising gradually from adjacent one lateral slot 31 toward the other lateral slot 31. Each cam surface 33 is provided substantially at its highest point with a radial groove or notch 35 adapted to receive and retain the lateral lugs 15 on the rotary stud 10 in secured position. The arrangement, accordingly, is such that the flanges 27 on the spring arm 23 maintain the intermediate base 26 in resilient spaced relation to the adjacent surface of the part B or B' to which the socket member is attached in a manner whereby said cam surfaces 33 are adapted to yield as the rotary stud 10 is applied to position the lateral lugs 15 in the grooves 35 of said socket member 20.

Figure 5:
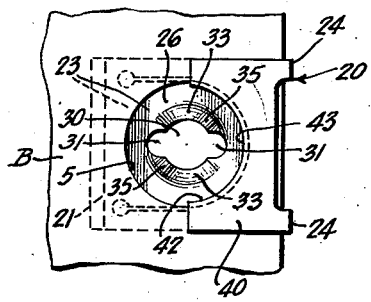
Fig. 5 is a bottom plan view of Fig. 3 showing the attaching portion of the socket member.

The body portion 40 of the socket member 20 is carried by the generally U-shaped side portions 24 and terminates substantially below and in line with the stud passage 30 in the body portion 21. As best seen in Fig. 5, the extremity of said body portion 40 is so recessed as to provide a generally arcuate or semicircular sight opening 42 and an upstanding locking projection or detent 43 formed by a bent marginal end portion of said sight opening 42. The locking detent 43 preferably has its upper edge surface tapered generally downwardly and outwardly toward the free end of the body portion 40 to define an inclined cam surface. The inclined cam surface of the locking detent 43 provides a flared entrance to the space between the body portions 21, 40, which facilitates the initial application thereof to a supporting part by causing a gradual outward camming of said detent 43 as necessary to clear the edge of said supporting part easily and quickly. When the socket member 20 is initially applied, the sight opening 42, Fig. 5, at the free end of body portion 40 leaves the opening 5 in the supporting part B uncovered and fully visible such that the socket member 10 may be guided readily, in the least amount of time and effort, to its proper attached position in which the locking detent 43 snaps into said opening 5 in the final applied fastening position of the socket member on the supporting part B, Fig. 3, or B', Fig. 6. The locking detent 42 preferably is semicircular and thereby defines an indexing or positioning element which snugly engages a material edge portion of the circular opening 5, Fig. 5, to lock said socket member 20 in attached position while otherwise leaving a sufficiently large passage for the rotary stud 10.

It will be understood from Figs. 3 and 6 that the socket member 20 thus provided with the yieldable or floating spring arm 23 extending free between the spaced body portions 21, 40, is adapted for ready attachment to the relatively thick part B, Fig. 3, or the relatively thin part B', Fig. 6, or any other part having a thickness within the range of use of the socket member. In the initial application of the socket member, as shown in Fig. 2, the inclined surface of detent 43 cams outwardly against an edge of said supporting part B while the spring arm 23 cams against the opposing edge of said part and gradually yields as necessary in accordance with the thickness of said part to permit the socket member 20 to be advanced to its fully attached fastening position. The resilient spring arm 23 and the opposing body portion 40 engage opposite faces of the supporting part B or B' to retain the socket member 20 in attached fastening position, as shown in Figs. 3 and 6, respectively, and the bearing portion 25 on said spring arm 26 slides on said supporting part and automatically positions the base 26 of said spring arm 23 for application of the rotary stud 10, Fig. 7, to the stud engaging elements 33, 35, thereon in a direction generally normal to said base 26 and substantially at right angles to the supporting part B in the most effective and proper manner.

The improved socket member 20 of the invention, accordingly, has a wide range of application to parts of different thicknesses by virtue of the construction comprising the spring arm 23 which extends free between the spaced body portions 21, 40, to serve as a yieldable take-up means which accommodates the socket member 20 for attachment to a supporting part of any particular thickness within the range intended. In any case, the body portion 40 is firmly and rigidly seated against one side of the supporting part while the spring arm 23 pivots relatively to the side portions 24 of the other body portion 21 as necessary to seat on the opposite side of said supporting part in the most effective manner in applied fastening position, as aforesaid. At the same time, the locking detent 43 on the body portion 40 snaps into and engages the adjacent wall of the opening 5 in the part B or B' to lock the socket member 20 in such applied fastening position.

In use, it will be understood that in the assembled position of part A against part B, Fig. 7, the rotary stud 10 carried by part A is projected through the opening 42 on the end of the inner or attaching portion 40 of the socket member 20, and through the opening 5 in supporting part B', and the stud passage 30 in the spring arm 23 on the body portion 21 of said socket member. The lateral lugs or ears 15 on the rotary stud 10, accordingly, finally extend through the lateral slots 31 of the stud passage 30 in the spring arm 23, in the operative position of the parts A, B, as shown in Fig. 7, whereupon said lateral lugs 15 are in position to engage or slightly clear the lowest points of the spiral cam surfaces 33 on said spring arm 23. The rotary stud 10 is then subjected to its initial clockwise turning movement, as by a screw driver applied to the tool receiving slot 12 in the head 11 thereof. Upon continued rotation of the stud 10 through a quarter turn or other predetermined portion of a single revolution, said lateral lugs 15 ride upwardly on the spiral cam surfaces 33 in a manner whereby the spring arm 23 is depressed and thereby flexed under tension to cause the parts A, B, to be clamped together under progressively increasing spring force. When turning of the stud 10 places the lateral lugs 15 in the region of the grooves or notches 35, said lugs 15 snap into said grooves 35 in a manner whereby further rotation of the stud 10 is arrested and said stud otherwise locked in final fastening position, substantially as shown in Fig. 7. In this relation, there is a pronounced inward tensioning force on the spring arm 23 and a corresponding flexing or yielding thereof which produces a continuously effective reverse spring force tending to maintain the lateral lugs 15 rigidly seated in said grooves 35. This, of course, holds the stud 10 against any possible reverse turning toward disengagement of the lateral lugs 15 from the grooves 34 unless and until the stud 10 is rotated reversely by the application of a suitable tool in properly uncoupling the stud 10 from the socket member 20.

The fastening arrangement, accordingly, is such as to lock together the cooperating members 10, 20, of the fastening device against accidental or unintended release from secured position while otherwise clamping the secured parts A, B, firmly and rigidly together in such a manner as to prevent any possible looseness or displacement of said parts even under extreme conditions of vibratory motion, or the like.

Release of the secured parts A, B, is easily and quickly effected simply by rotating the stud 10 in a reverse direction under tool force, whereupon the lateral lugs 15 will cause a suitable flexing and depression of the spring arm 23 as necessary to permit said lugs 15 to move out of the grooves 35. By continued reverse rotation of the stud 10, said lateral lugs 15 will ride downwardly on the spiral cam surfaces 33, finally disengaging therefrom in the lateral slots 31, whereupon the stud 10 is fully released and is readily withdrawn from the socket member 20 to permit the cover or other part A to be removed from the supporting part B.

It will be appreciated that the flexing of the spring arm 23 of the socket member 20 either in securing or releasing the members of the fastening device results in no permanent distortion or deformation of the metal of said socket member 20 so that upon release of the fastening members 10 from locked relation, as aforesaid, the various elements of the socket member 20 automatically assume their initial, normally untensioned configuration ready for coupling engagement with the stud member 10 in the same or similar installation in a repetition of the previously described procedure.

The socket member 20 of the invention preferably is constructed of relatively thin sheet metal the thickness of which is selected according to service requirements and the predetermined size of the parts to be secured. The socket member is most effective when provided of spring metal suitably tempered and otherwise treated to give the desired toughness and hardness, particularly in the case of devices which are subject to constant usage in heavy duty applications. A cheap and highly satisfactory socket member may be provided from cold rolled metal such as cold rolled steel which is untempered but of a spring metal nature and capable of providing an effective and reliable fastening device, as and for the purposes described.

While the invention has been described in detail with a specific example, such example is intended as an illustration only inasmuch as the invention fully contemplates various modifications which may be provided without departing from the spirit and scope of the invention.

What is claimed is:

1. A self-attached socket member for a rotary stud, said socket member comprising a piece of sheet metal having a return bend defining a pair of spaced body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions of the socket member being provided with a spring arm stamped from within the periphery thereof and having a free end extending toward said return bend of the socket member said spring arm defining a base and a pair of downwardly extending flanges for supporting the base, said spring arm having a stud passage spaced from its free end including a lateral slot for passing a stud having a lateral lug, and the marginal portion of said stud passage being formed to provide stud engaging means comprising a cam surface engageable by said lateral lug on the rotary stud responsive to turning force on said stud and a retaining notch disposed substantially at the highest point of the cam surface for retaining the lug in attached position, said spring arm being bent bodily inwardly toward the other body portion such that said free end thereof is spaced from said other body portion a distance less than the thickness of any part with which the socket member is intended to be used, said base being disposed above the plane of said one body portion, said inwardly bent spring arm being adapted to yield in accordance with the thickness of the part to which the socket member is applied to cooperate with said other body portion of the socket member in engaging opposite sides of said part in the attached position of the socket member thereon, said spring arm having means for maintaining said stud engaging means thereon in resilient spaced relation to the part on which the socket member is attached regardless of the thickness of said part with said stud engaging means in position for application of the rotary stud thereto with the axis of said rotary stud in substantially normal relation to said part, said other body portion of the socket member having an opening in line with said stud passage in said spring arm and of such size as to permit free passage of said rotary stud, and an inwardly projecting detent adjacent the latter opening receivable in the aperture in said part to retain said socket member in said attached fastening position on said part.

2. A self-attached socket member for a rotary stud, said socket member comprising a piece of sheet metal having a return bend defining a pair of spaced body portions extending in the same general direction and adapted to receive an apertured supporting part therebetween, one of said body portions of the socket member carrying a spring arm provided with a resilient base having a free end and projecting outwardly from said body portion and provided with downwardly extending flanges for supporting said base, said base being disposed above the plane of said one body portion, said base having a stud passage spaced from its free end including a lateral slot for passing a stud having a lateral lug, the marginal portion of said stud passage being formed to provide stud engaging means comprising a cam surface engageable by said lateral lug on the rotary stud responsive to turning force on said stud and a retaining notch disposed substantially at the highest point of the cam surface for retaining the lug in attached position.

3. A self-attached socket member for a rotary stud, said socket member comprising a piece of sheet metal having a return bend defining a pair of spaced body portions extending in the same general direction and adapted to receive an apertured supporting part therebetween, one of said body portions of the socket member carrying a spring arm provided with a resilient base having a free end and projecting outwardly from said body portion and provided with downwardly extending flanges for supporting said base, said base being disposed above the plane of said one body portion, said base having a stud passage spaced from its free end including a lateral slot for passing a stud having a lateral lug, the marginal portion of said stud passage being formed to provide stud engaging means comprising a cam surface engageable by said lateral lug on the rotary stud responsive to turning force on said stud and a retaining notch disposed substantially at the highest point of the cam surface for retaining the lug in attached position, the other body portion of the socket member having an opening in line with said stud passage in said base and of such size as to permit free passage of said rotary stud, and an inwardly projecting detent adjacent the latter opening receivable in the aperture in said part to retain said socket member in attached fastening position on said part.

4. A self-attached socket member for a rotary stud, said socket member comprising a piece of sheet metal having a return bend defining a pair of spaced body portions extending in the same general direction and adapted to receive an apertured supporting part therebetween, one of said body portions of the socket member carrying an arm defining an outwardly projecting base having a free end and a pair of downwardly extending flanges for supporting said base in resilient relation to said part on which said socket member is attached, said base being disposed above the plane of said one body portion, said base having a stud passage spaced from its free end including a lateral slot for passing a stud having a lateral lug, the marginal portion of said stud passage being formed to provide stud engaging means comprising a cam surface engageable by said lateral lug on the rotary stud responsive to turning force on said stud and a retaining notch disposed substantially at the highest point of the cam surface for retaining the lug in attached position.

References Cited in the file of this patent

UNITED STATES PATENTS

| | | |
|---|---|---|
| 2,140,064 | Tinnerman | Dec. 13, 1938 |
| 2,228,584 | Place | Jan. 14, 1941 |
| 2,250,072 | Tinnerman | July 22, 1941 |
| 2,306,952 | Jones | Dec. 29, 1942 |
| 2,327,327 | Maynard | Aug. 17, 1943 |
| 2,432,492 | Tinnerman | Dec. 9, 1947 |
| 2,581,581 | Hartman | Jan. 8, 1952 |
| 2,641,814 | Hartman | June 16, 1953 |